US008825904B2

(12) United States Patent
Leng et al.

(10) Patent No.: US 8,825,904 B2
(45) Date of Patent: Sep. 2, 2014

(54) METHOD, APPARATUS, SYSTEM FOR ADDRESS MANAGEMENT

(75) Inventors: Tong Leng, Guangdong Province (CN); Jun Feng, Guangdong Province (CN); Zhining Ye, Guangdong Province (CN); Lu Gao, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 155 days.

(21) Appl. No.: 13/497,706

(22) PCT Filed: May 11, 2010

(86) PCT No.: PCT/CN2010/072597
§ 371 (c)(1),
(2), (4) Date: Apr. 17, 2012

(87) PCT Pub. No.: WO2011/035587
PCT Pub. Date: Mar. 31, 2011

(65) Prior Publication Data
US 2012/0198096 A1 Aug. 2, 2012

(30) Foreign Application Priority Data

Sep. 23, 2009 (CN) .......................... 2009 1 0178104

(51) Int. Cl.
| G06F 15/16 | (2006.01) |
| H04L 12/64 | (2006.01) |
| H04L 29/12 | (2006.01) |
| H04L 12/24 | (2006.01) |
| H04L 12/66 | (2006.01) |
| H04L 12/28 | (2006.01) |
| H04L 12/56 | (2006.01) |

(52) U.S. Cl.
CPC ............. *H04L 12/6418* (2013.01); *H04L 45/58* (2013.01); *H04L 61/2061* (2013.01); *H04L 41/0663* (2013.01); *H04L 12/66* (2013.01); *H04L 12/2856* (2013.01); *H04L 61/2007* (2013.01)
USPC ........................................................ 709/245

(58) Field of Classification Search
USPC ......................................................... 709/245
See application file for complete search history.

(56) References Cited

U.S. PATENT DOCUMENTS

| 7,197,549 B1 | 3/2007 | Salama et al. | |
| 7,430,614 B2 * | 9/2008 | Shen et al. ..................... | 709/245 |

(Continued)

FOREIGN PATENT DOCUMENTS

| CN | 1455563 A | * 11/2003 |
| CN | 1585361 A | 2/2005 |
| CN | 101166147 A | 4/2008 |
| WO | 0117199 A1 | 3/2001 |
| WO | 2008074369 A1 | 6/2008 |

OTHER PUBLICATIONS

English translation of CN1455563A.*

(Continued)

*Primary Examiner* — Kevin Bates
*Assistant Examiner* — Nazia Naoreen
(74) *Attorney, Agent, or Firm* — Stephen Yang; Ling Wu; Ling and Yang Intellectual Property

(57) ABSTRACT

The present invention discloses a method for address management, at least one backup group exists between a broadband remote access server (BRAS) and a backup device, and the method includes: when the BRAS receives an access request of a user, detecting whether there is an idle address in a backup group accessed by the user; if there is no idle address in the backup group accessed by the user, then the BRAS assigning a new logical segment to the backup group, wherein the logical segment contains at least one address; and the BRAS selecting an address from the new logical segment and assigning the address to the user. The present invention also discloses an apparatus and system for address management. The method, apparatus and system of the present invention realize the flexible management of the sharing address pool, and solve the problem of a waste of resources.

10 Claims, 4 Drawing Sheets

(56) References Cited

U.S. PATENT DOCUMENTS

| | | |
|---|---|---|
| 8,560,658 B2 * | 10/2013 | Bedare et al. ............... 709/223 |
| 2003/0058849 A1 * | 3/2003 | Verbesselt .................. 370/386 |
| 2005/0097223 A1 | 5/2005 | Shen et al. |
| 2007/0174729 A1 * | 7/2007 | Jiang et al. .................. 714/43 |
| 2007/0266163 A1 * | 11/2007 | Xiong et al. ............... 709/228 |
| 2013/0326014 A1 * | 12/2013 | Niu et al. .................... 709/217 |

OTHER PUBLICATIONS

XP15001673A, "DHCP Failover Protocol", Network Working Group, Internet Draft, Mar. 2003, pp. 1-133.

International Search Report for PCT/CN2010/072597 dated Jul. 27, 2010.

* cited by examiner

METHOD, APPARATUS, SYSTEM FOR ADDRESS MANAGEMENT

TECHNICAL FIELD

The present invention relates to the communication field, and in particular, to a method, apparatus and system for address management in a scenario of backup between broadband remote access server (BRAS) devices.

BACKGROUND OF THE RELATED ART

A service control layer of a broadband metropolitan area network is a particular layer of a service access network connecting a core switched network. A device playing an important role is a BRAS, which mainly undertakes functions of aspects of service access control and user management.

With putting forward the high quality guarantee requirement of services provided by a network, it puts forward much higher requirement to the performance and the reliability of the BRAS product of the service control layer. Due to the functions undertook by the BRAS product and the location the BRAS locates in the network, it is demanded that the BRAS has the high reliability, so the concept of dual module hot spare of the BRAS emerges as the time require. The dual module hot spare of the BRAS is to deploy two BRAS products in the control layer of the network. During working, the two devices are set as that one is in a main state and another is in a standby state by negotiating or manually configuring, and the main device is used to control user accessing and record user information, and back up the user information on the backup device by real-time synchronization or batch synchronization. When the main device breaks down, it is able to realize main-standby switching rapidly. Since the user information has been already backed up to the standby state device, the user does not have the perception in the process of the main-standby switching of the devices, which ensures service quality and enhances user service experience.

The BRAS device airward connects to a core router (CR) device of the metropolitan area network, and notifies the network segment routing information of an address pool in which the user locates to the CR through a static route or an interior gateway protocol (IGP); and the CR does not maintain host routing information. The CR, after receiving the service flow, sends the service flow to the corresponding BRAS according to the network segment in which the destination address of the service flow locates. Between two BRASs as backup device of each other, the backup of the complete machine level, the line card level, the port level and the virtual sub-interface level can be supported, and a group of minimum abnormal switching units which back up each other are called a backup group. Among the main-standby devices, a plurality of backup groups can be established. For example, 20 ports of the main device perform backing up with the backup device one by one, there are 20 backup groups among the devices, and the backup group is identified through the port corresponding to each backup group.

The dual module hot spare mode of the BRAS supports switching of the single backup group, that is, when one port of the main device breaks down, the services at the backup group corresponding to that port is switched to the backup device; at the moment, it needs to change the routing information on the CR, so that the CR routes the service flow onto the backup device when the CR performs routing for the service flow of that backup group. When a plurality of backup groups share the same address pool, if a certain backup group performs the switching while other backup groups are not switched, then it is unable to change the routing information of the address pool on the CR, and the backup group which is switched already will be unable to receive the service flow normally. In order to prevent the problem that the CR is unable to route the service flow, a following method is adopted:

one address pool is configured individually for each backup group, for each backup group, the BRAS, as the main device, issues the routing information of the address pool to the CR; when the BRAS is abnormal and the switching is performed, the routing information of the main device of the backup group after switching is issued to the CR.

There is the following problem in above-mentioned process of the CR routing the service flow to the corresponding BRAS:

the address pool of each backup group cannot be shared with other backup groups, in this situation, a phenomenon may appear that the addresses in the address pool of one backup group has already been exhausted but there are a large number of residual addresses in the address pool of another backup group, which exists severe address waste, and affects the access service quality.

CONTENT OF THE INVENTION

The present invention provides a method, apparatus and system for address management, which solves the problem of the waste of resources brought by the backup group occupying the address pool individually.

A method for address management, at least one backup group exists between a BRAS and a backup device, and the method comprises:

when the BRAS receives an access request of a user, detecting whether there is an idle address in a backup group accessed by the user;

if there is no idle address in the backup group accessed by the user, then the BRAS assigning a new logical segment to the backup group, wherein the logical segment contains at least one address; and the BRAS selecting an address from the new logical segment and assigning the address to the user.

If there is no idle address in the backup group accessed by the user, then after the step of assigning the new logical segment to the backup group, the method further comprises:

the BRAS issuing routing information of the new logical segment to a CR; and the BRAS synchronizing a corresponding relation of the logical segment with the backup group to the backup device.

When the BRAS receives the access request of the user, before the step of detecting whether there is the idle address in the backup group accessed by the user, the method further comprises:

dividing a sharing address pool managed by the BRAS into at least two logical segments, wherein the logical segment contains at least one address.

When the BRAS receives the access request of the user, before the step of detecting whether there is the idle address in the backup group accessed by the user, the method further comprises:

judging whether the BRAS is a main device of the backup group accessed by the user; and refusing an online request of the user if the BRAS is not the main device of the backup group accessed by the user.

The method for address management further comprises:

when the backup group is switched and the backup device of the BRAS is regarded as the main device, the backup device notifying the CR to update the routing information of the backup group.

The method for address management further comprises:

if there is an idle logical segment in the backup group, then the BRAS retrieving the logical segment and notifying the CR to cancel routing information of the logical segment.

A BRAS comprises:

a detection module, configured to, when receiving an access request of a user, detect whether there is an idle address in a backup group accessed by the user;

a logical segment management module, configured to, when the detection module detects that there is no idle address in the backup group accessed by the user, assign a new logical segment to that backup group, wherein the logical segment contains at least one address; and an address management module, configured to, select an address from the new logical segment and assign the address to the user.

The above-mentioned BRAS further comprises:

a routing information issue module, configured to, after the logical segment management module assigns the new logical segment to the backup group, issue routing information of the new logical segment to a core router (CR); and a logical segment dividing module, configured to divide a sharing address pool into at least two logical segments, wherein the logical segment contains at least one address.

The logical segment management module is further configured to retrieve the logical segment when there is an idle logical segment in the backup group;

the routing information issue module is further configured to:

after the logical segment management module retrieves the logical segment, notify the CR to cancel routing information of that logical segment; or when the backup group is switched, notify the CR to update routing information of that backup group.

A system for address management comprises a CR, a first BRAS and a second BRAS; wherein, both the first BRAS and the second BRAS connect with the CR; at least one backup group is put between the first BRAS and the second BRAS, the first BRAS is a main device of the at least one backup group, and the second BRAS is a backup device of the first BRAS; wherein, the first BRAS is configured to divide a sharing address pool into at least two logical segments, when receiving an access request of a user, detect whether there is an idle address in a backup group accessed by the user; when a detection module detects that there is no idle address in the backup group accessed by the user, then assign a new logical segment to that backup group, select one address from the new logical segment and assign the address to the user, and issue routing information of the new logical segment to the CR; and the CR is configured to receive the routing information issued by the first BRAS and route a service flow according to the routing information.

The first BRAS is further configured to retrieve the logical segment when there is an idle logical segment in the backup group, notify the CR to cancel routing information of the logical segment, and switch with the second BRAS which acts as a main device of the backup group; and the second BRAS is configured to, when switching with the first BRAS and becoming the main device of the backup group, notify the CR to update the routing information of the backup group.

The embodiments of the present invention provide a method, apparatus and system for address management. The same sharing address pool is shared by a plurality of backup groups between two BRASs which are the backup devices of each other, the sharing address pool is divided into a plurality of logical segments, and when there is a user accessing the backup group, the address segment is assigned to the backup group in real time, according to the requirement of each backup group, and the BRAS assigns the address to the user from the address segment that is obtained by assigning; and when the backup group does not use a certain address segment, that address segment is released, which realizes the flexible management to the sharing address pool and solves the problem of the waste of resources brought by the backup group occupying the address pool individually.

PREFERRED EMBODIMENTS OF THE PRESENT INVENTION

In order to solve a problem of a waste of resources brought by the backup group occupying the address pool individually, embodiments of the present invention provide a method for address management.

In a dual module hot spare mode of BRAS, the user accesses a convergence device through an access network, the convergence device connects to two BRASs in dual-upstream, and the BRAS plays a gateway role and terminates the user VLAN. The main-standby relation is negotiated between the two BRAS devices through a virtual router redundancy protocol (VRRP). The two BRAS devices have two operating modes: 1:1 and 1+1.

For example, the BRAS1 and the BRAS2 are the backup devices of each other, and work in the dual module hot spare mode. In the operating mode of 1:1, if the BRAS1 is a main device, then the BRAS1 bears user services, and the BRAS2 acts as a backup device and only backs up the user information on the BRAS1; while in the operating mode of 1+1, for the user of one set group, for example, for one backup group, the BRAS1 is a main device, and the BRAS2 is a backup device, but for another backup group, the BRAS2 can be a main device, and the BRAS2 is a backup device, that is, in the normal operation, both the BRAS1 and the BRAS2 bear a part of the user services. The method for address management provided by the embodiments of the present invention is suitable for any one of the above-mentioned operating modes.

Figure 1:
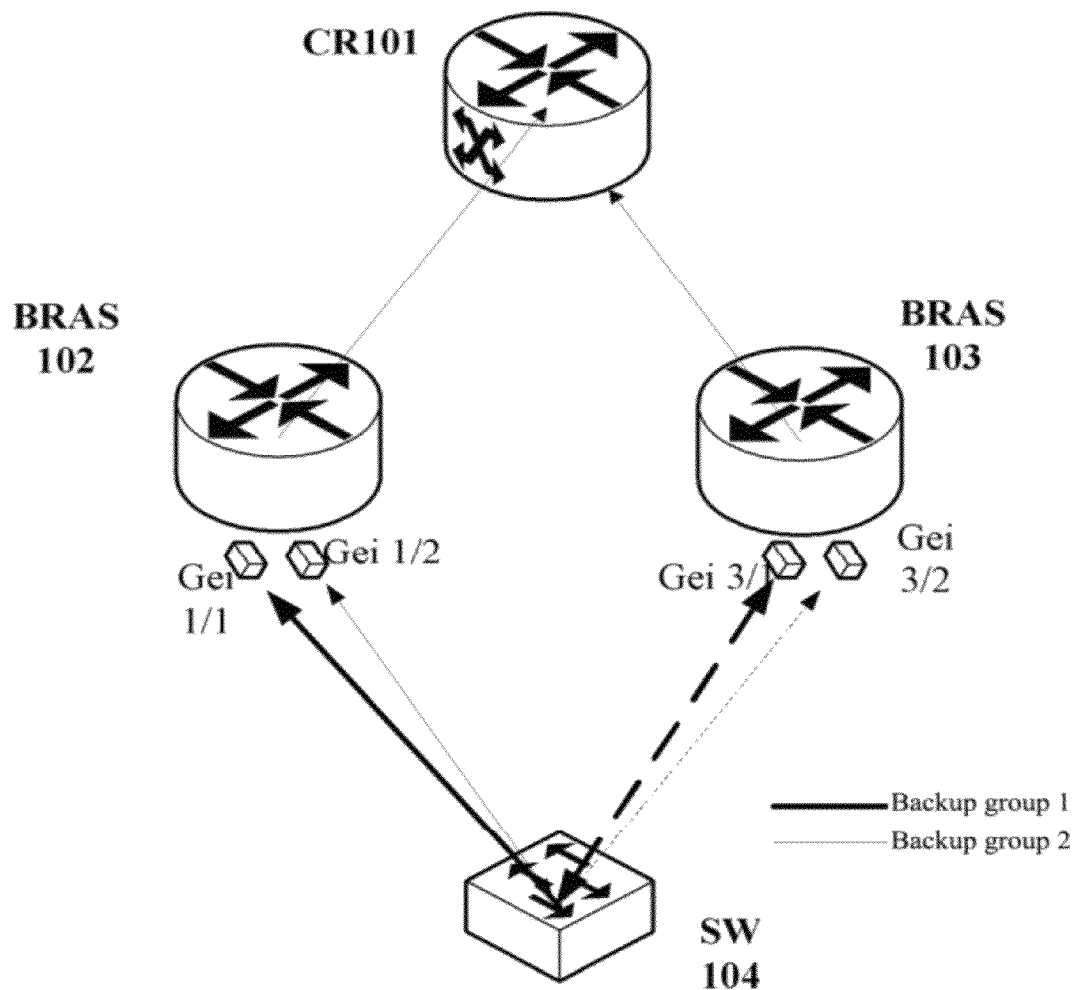
FIG. 1 is a structure diagram of an application scenario according to an embodiment of the present invention.

First of all, the application scenario of the embodiment of the present invention is introduced; as shown in FIG. 1, the CR101 downwards connects with the BRAS102 and the BRAS103 which are the backup devices of each other, and the BRAS102 shares the same address pool with the BRAS103; there are N (N>=2) backup groups put between the BRAS102 and the BRAS103; and the BRAS102 and the BRAS103 downwards connect with the SW (switch device) 104, and the user accesses the network through the SW104.

The embodiment of the present invention is described in combination with the above-mentioned application scenario hereinafter.

Figure 2:
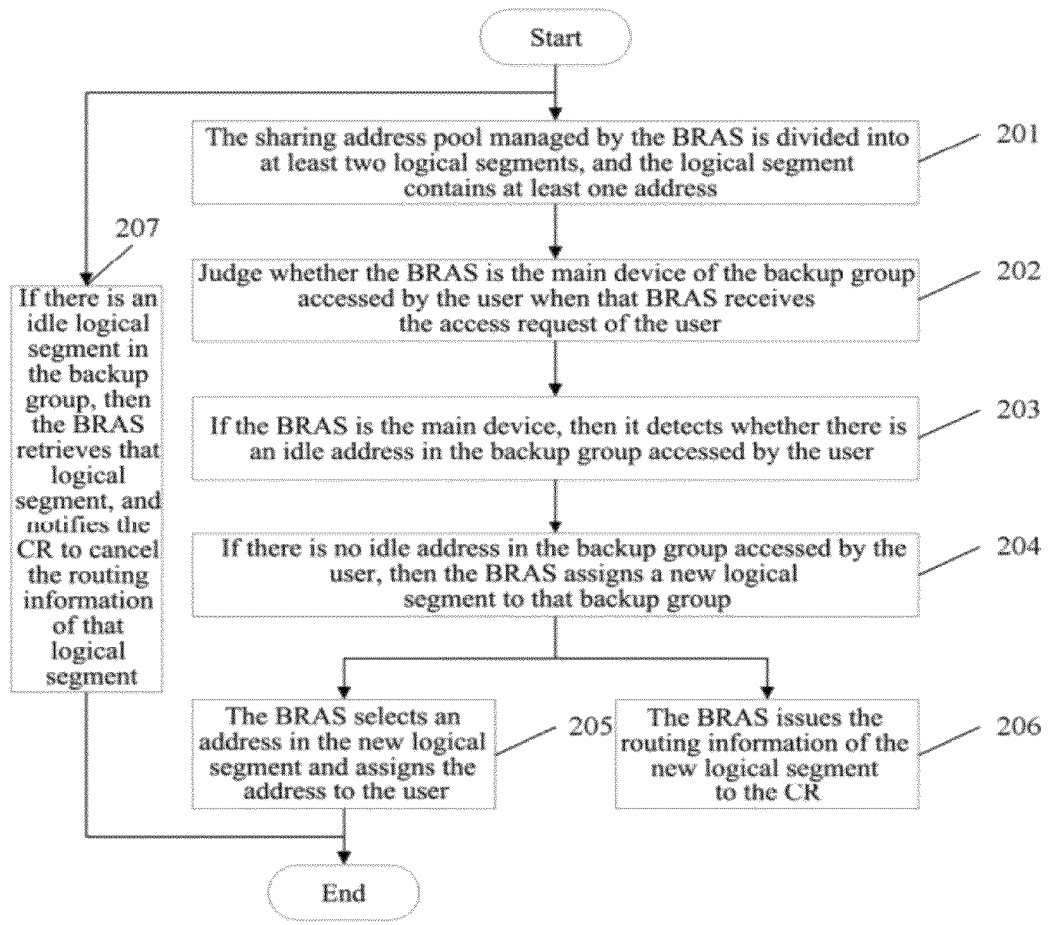
FIG. 2 is a flow chart of a method for address management provided by embodiment one of the present invention.

The embodiment one of the present invention provides a method for address management, the flow of managing addresses in a sharing address pool in the dual module hot spare mode of the BRAS by using that method is shown in FIG. 2, including the following steps.

In step 201, the sharing address pool managed by the BRAS is divided into at least two logical segments, and the logical segment contains at least one address;

in this step, the sharing address pool is divided into at least two logical segments, and generally divided into the logical segments with same size, and the size of the logical segment can be adjusted according to the sharing address pool and the data of the backup group. The logical segment is suggested to be D class address, corresponding to 256 addresses.

In step 202, the BRAS judges whether that BRAS is the main device of the backup group accessed by the user when receiving the access request of the user.

The embodiment of the present invention is illustrated by taking that in all backup groups, the BRAS102 acts as the main device and the BRAS103 acts as the backup device at the beginning for example. (Here there is one question how to confirm from which backup group the user accesses?)

In this step, if the user sends an access request to the BRAS to apply accessing, then that BRAS needs to confirm whether the BRAS itself is a main device firstly. If the BRAS103 receives that access request, the BRAS103 refuses the access request of the user since the BRAS103 is a backup device; and if the BRAS102 receives that access request, since the BRAS102 is a main device, then the BRAS102 can perform accepting that access request and finish the user accessing.

In step 203, if the BRAS is the main device, then it detects whether there is an idle address in the backup group accessed by the user.

In the BRAS, the using condition of each logical segment and address in the sharing address pool is recorded.

In this step, the BRAS102 detects whether there is still an idle address in the backup group accessed by the user; if there is an idle address, then the idle address is assigned to the user directly; and if not, it needs to apply a new logical segment.

In step 204, if there is no idle address in the backup group accessed by the user, then the BRAS assigns a new logical segment to that backup group.

In this step, the BRAS102 selects a logical segment from the unused logical segments in the sharing address pool and assigns to that backup group, and synchronizes the corresponding relation of the logical segment and the backup group to the BRAS103.

In step 205, the BRAS selects an address in the new logical segment and assigns to the user.

In this step, the BRAS assigns one address for that user in the logical segment assigned in step 204.

In step 206, the BRAS issues the routing information of the new logical segment to the CR.

In this step, the BRAS102 issues the routing information of that logical segment to the CR101, indicating the CR101 to route the service flow of the destination address in the logical segment to the BRAS102.

After the user is offline, the address occupied by the user will be released. When all the addresses on one logical segment assigned to the backup group are idle, it needs to retrieve that logical segment, such as, step 207, in order to avoid a waste of addresses.

In step 207, if there is an idle logical segment in the backup group, then the BRAS retrieves that logical segment, and notifies the CR to cancel the routing information of that logical segment.

In this step, if all the addresses in one logical segment of the backup group are idle, then the logical segment is retrieved and the CR is notified to cancel the routing information of that logical segment, which saves the routing list space of the CR; meanwhile, the information of the logical segment corresponding to that backup group is synchronized to the BRAS103, and the corresponding relation of the retrieved logical segment and that backup group is deleted.

In the method for address management provided by the embodiment of the present invention, the same sharing address pool is shared by a plurality of backup groups between two BRASs which are the backup devices of each other, the sharing address pool is divided into a plurality of logical segments, and when there is a user accessing the backup group, the address segment is assigned to the backup group in real time, according to the requirement of each backup group, and the BRAS assigns the address to the user from the address segment that is obtained by assigning; and when the backup group does not use a certain address segment, that address segment is released, which realizes the flexible management to the sharing address pool and solves the problem of the waste of resources brought by the backup group occupying the address pool individually.

The embodiment two of the present invention is described in combination with the accompanying drawings hereinafter.

Figure 3:
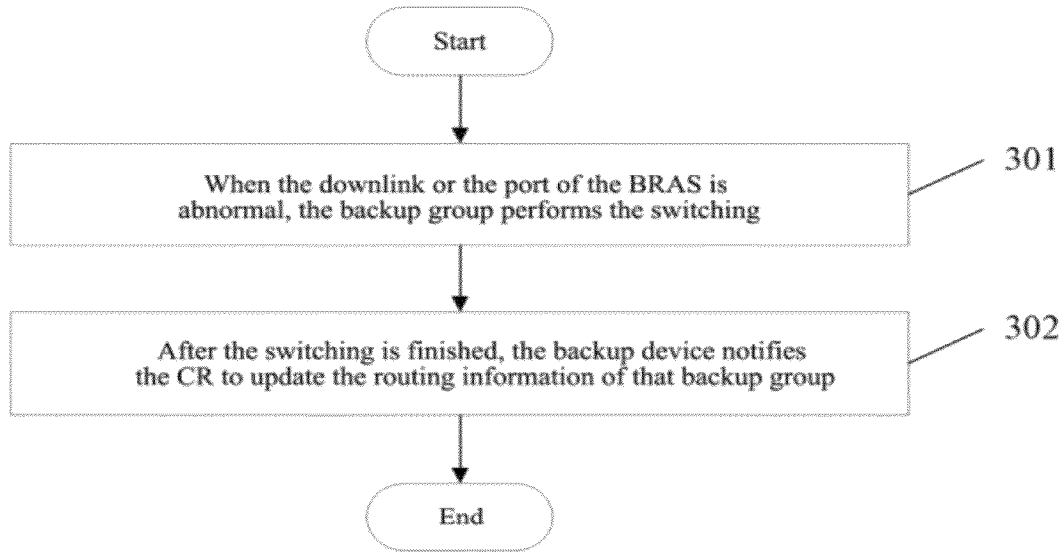
FIG. 3 is a flow chart of a method for address management provided by embodiment two of the present invention.

Still in combination with the application scenario shown in FIG. 1, the embodiment two of the present invention provides a method for address management, which can finish updating of the routing information on the CR when it is abnormal and performs the switching, and the specific flow is shown in FIG. 3, including the following steps.

In step 301, when the BRAS port or the downlink is abnormal, the backup group performs the switching;

in this step, one port or downlink of the BRAS102 is abnormal, and the corresponding backup group needs to perform the switching, then the user corresponding to that port or downlink on the BRAS102 is switched to the BRAS103; for that backup group, the BRAS102 is switched to be a standby state, and the BRAS103 is switched to be a main state, that is, the current main device is the BRAS103.

In step 302, after the switching is finished, the backup device notifies the CR to update the routing information of that backup group;

in this step, the BRAS103 notifies the CR101 to update the routing information of that backup group, indicating the CR101 after this to route all the service flows of the destination addresses in the logical segment of that backup group to the BRAS103.

Figure 4:
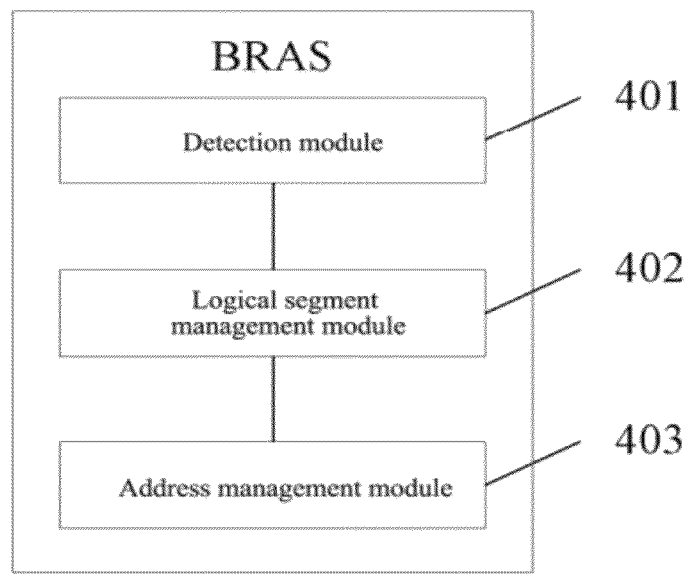
FIG. 4 is a structure diagram of a BRAS provided by an embodiment of the present invention.

The embodiment of the present invention further provides a BRAS, as shown in FIG. 4, including:

a detection module 401, configured to, when receiving an access request of a user, detect whether there is an idle address in a backup group accessed by the user;

a logical segment management module 402, configured to, when the detection module 401 detects that there is no idle address in the backup group accessed by the user, assign a new logical segment to the backup group, wherein the logical segment contains at least one address; and an address management module 403, configured to, select an address from the new logical segment and assign the address to the user.

Figure 5:
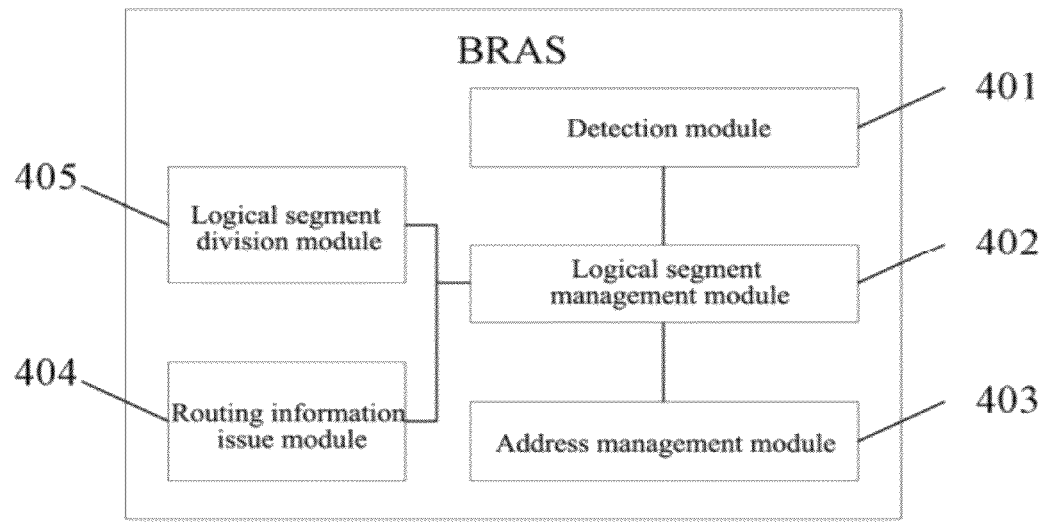
FIG. 5 is a structure diagram of a BRAS provided by another embodiment of the present invention.

Furthermore, that BRAS, as shown in FIG. 5, further includes:

a routing information issue module 404, configured to, after the logical segment management module 402 assigns the new logical segment to the backup group, issue routing information of the new logical segment to a CR; and a logical segment division module 405, configured to divide a sharing address pool into at least two logical segments, wherein the logical segment contains at least one address.

Furthermore, the logical segment management module 402 is further configured to retrieve the logical segment when there is an idle logical segment in the backup group;

the routing information issue module 404 is further configured to: after the logical segment management module 402 retrieves the logical segment, notify the CR to cancel routing information of the logical segment; or when the backup group is switched, notify the CR to update the routing information of the backup group.

Figure 6:
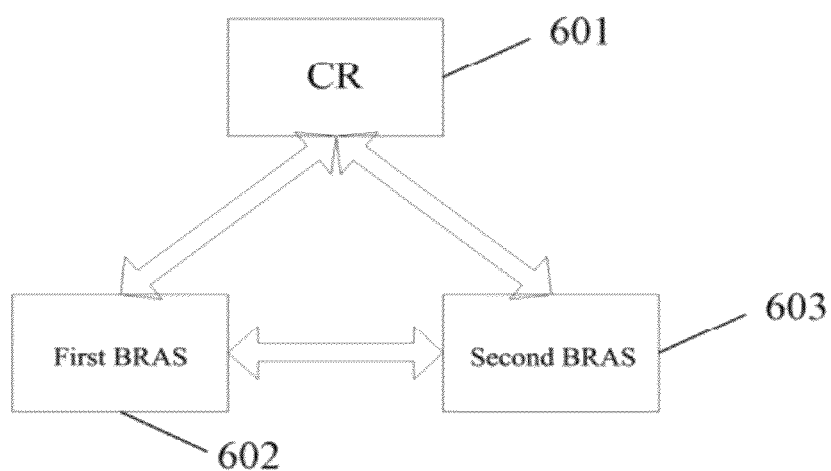
FIG. 6 is a structure diagram of a system for address management provided by an embodiment of the present invention.

The embodiment of the present invention further provides a system for address management, and as shown in FIG. 6, the system includes a CR601, a first BRAS602 and a second BRAS603; wherein, both the first BRAS602 and the second BRAS603 connect with the CR601; there is at least one backup group put between the first BRAS602 and the second BRAS603, the first BRAS602 is a main device of the at least one backup group, and the second BRAS603 is a backup device of the first BRAS602;

the first BRAS602 is configured to divide a sharing address pool into at least two logical segments, when receiving an access request of a user, detect whether there is an idle address in a backup group accessed by the user; when a detection module detects that there is no idle address in the backup group accessed by the user, assign a new logical segment to the backup group, select one address from the new logical segment and assign the address to the user, and issue routing information of the new logical segment to the CR; and the CR601 is configured to receive the routing information issued by the first BRAS602 and route a service flow according to the routing information.

Furthermore, the first BRAS602 is further configured to retrieve the logical segment when there is an idle logical segment in the backup group, notify the CR to cancel routing information of the logical segment, and switch with the second BRAS which acts as a main device of the backup group; and the second BRAS603 is configured to, when switching with the first BRAS602 and becoming the main device of the backup group, notify the CR601 to update the routing information of the backup group.

The above-mentioned BRAS and the system for address management can be combined with the method for address management provided by the embodiment of the present invention; wherein, the same sharing address pool is shared by a plurality of backup groups between two BRASs which are the backup devices of each other, the sharing address pool is divided into a plurality of logical segments, and when there is a user accessing the backup group, the address segment is assigned to the backup group in real time, according to the requirement of each backup group, and the BRAS assigns the address to the user from the address segment that is obtained by assigning; and when the backup group does not use a certain address segment, that address segment is released, which realizes the flexible management to the sharing address pool and solves the problem of the waste of resources brought by the backup group occupying the address pool individually.

It can be understood by those skilled in the art that implementation of all or part of the steps carried in the above-mentioned method of the embodiments can be fulfilled by programs instructing the relevant hardware, and the programs can be stored in a computer readable storage medium. When the programs are performed, one of or the combination of the steps of the method embodiments are included.

In addition, each function unit in each embodiment of the present invention can be implemented in the form of hardware, or in the form of software function module. The integrated module also can be stored in a computer readable storage medium if it is realized in the form of software function module and is sold or used as an individual product.

The above-mentioned storage medium can be a read only memory, a magnetic disk or an optical disk, etc.

The above description is only the specific embodiments of the present invention, but the protection scope of the present invention is not limited to those. Those skilled in the art can easily make variations and equivalents within the technical scope disclosed by the present invention. And all of the variations and equivalents should be embodied in the protection scope of the present invention. Therefore, the protection scope of the present invention should be subject to the protection scope described by the appended claims.

INDUSTRIAL APPLICABILITY

The embodiments of the present invention provide a method, apparatus and system for address management. The same sharing address pool is shared by a plurality of backup groups between two BRASs which are the backup devices of each other, the sharing address pool is divided into a plurality of logical segments, and when there is a user accessing the backup group, the address segment is assigned to the backup group in real time, according to the requirement of each backup group, and the BRAS assigns the address to the user from the address segment that is obtained by assigning; and when the backup group does not use a certain address segment, that address segment is released, which realizes the flexible management to the sharing address pool and solves the problem of the waste of resources brought by the backup group occupying the address pool individually.

What we claim is:

1. A method of address management implemented on two broadband remote access servers (BRAS)s that work in a dual module hot spare mode comprising:
   utilizing two BRASs running a dual module hot spare mode that are backing up each other, wherein a plurality of backup groups are deployed between the two BRASs and share a sharing address pool managed by the BRASs;
   dividing the sharing address pool into at least two logical segments, wherein each of the logical segments contains at least one address;
   assigning at least two logical segments to the plurality of backup groups;
   when one of the two BRASs receives an access request of a user, determining whether the BRAS is a main device of the backup group accessed by the user, detecting whether there is an idle address in the backup group accessed by the user when the BRAS is the main device of the backup group accessed by the user;
   assigning the idle address to the user directly by the main BRAS if there is idle address in the backup group accessed by the user;
   assigning a new logical segment to the backup group by the main BRAS if there is no idle address in the backup group accessed by the user; and
   selecting an address from the new logical segment and assigning the address to the user by the main BRAS.

2. The method according to claim 1, wherein, if there is no idle address in the backup group accessed by the user, after the step of assigning the new logical segment to the backup group, the method further comprises:

The main BRAS issuing routing information of the new logical segment to a core router (CR); and the main BRAS synchronizing the corresponding relation of the logical segment and the backup group to the backup BRAS.

3. The method according to claim 1, further comprising:
refusing an online request of the user if the BRAS is not the main device of the backup group accessed by the user.

4. The method according to claim 1, further comprising:
when the backup group is switched and the backup BRAS functions as the main device, the backup device notifying the CR to update the routing information of the backup group.

5. The method according to claim 1, further comprising:
if there is an idle logical segment in the backup group, the main BRAS retrieving the logical segment and notifying the CR to cancel routing information of the logical segment.

6. A system for address management, comprising two broadband remote access servers (BRAS)s, the two BRASs running a dual module hot spare mode that are backing up each other, wherein a plurality of backup groups are deployed between the two BRASs and share a sharing address pool managed by the BRASs, any one of the two BRASs comprises at least one processor executing:

a logical segment dividing module (405), configured to divide the sharing address pool into at least two logical segments, wherein a logical segment contains at least one address;

a determining module, configured to determine whether the BRAS is a main device of the backup group accessed by the user when receiving an access request of a user, notify a detection module (401) to detect whether there is an idle address in the backup group accessed by the user when the BRAS is the main device of the backup group accessed by the user;

the detection module (401), configured to, detect whether there is an idle address in a backup group accessed by the user according to the notification of the determining module;

a logical segment management module (402), configured to, assign at least two logical segments to the plurality of backup groups; assign a new logical segment to that backup group when the detection module (401) detects that there is no idle address in the backup group accessed by the user; and an address management module (403), configured to, select an address from the new logical segment and assign the address to the user; assign the idle address to the user directly when the detection module (401) detects that there is idle address in the backup group accessed by the user.

7. The system according to claim 6, at least one processor further executing:

a routing information issue module (404), configured to, issue routing information of the new logical segment to a core router (CR) after the logical segment management module assigns the new logical segment to the backup group.

8. The system according to claim 6, wherein,
the logical segment management module (402) is further configured to retrieve the logical segment when there is an idle logical segment in the backup group;

the routing information issue module (404) is further configured to:

notify the CR to cancel routing information of that logical segment after the logical segment management module retrieves the logical segment; or notify the CR to update routing information of that backup group when the backup group is switched.

9. A system for address management, working in a dual module hot spare mode of broadband remote access server (BRAS), comprising a core router (CR) (601), a first BRAS (602) and a second BRAS (603); wherein, both the first BRAS (602) and the second BRAS (603) connect with the CR (601); a plurality of backup groups are deployed between the first BRAS (602) and the second BRAS (603) and share a sharing address pool managed by the first BRAS (602) and the second BRAS (603), the first BRAS (602) is a main device of the at least one backup group, and the second BRAS (603) is a backup device of the first BRAS; wherein, the first BRAS (602) is configured to divide the sharing address pool into at least two logical segments, wherein the logical segment contains at least one address; the at least two logical segments are assigned to the plurality of backup groups; when receiving an access request of a user, detect whether there is an idle address in a backup group accessed by the user; assign the idle address to the user directly if there is idle address in the backup group accessed by the user; assign a new logical segment to that backup group if there is no idle address in the backup group accessed by the user, select one address from the new logical segment and assign the address to the user, and issue routing information of the new logical segment to the CR (601); and the CR (601) is configured to receive the routing information issued by the first BRAS (602) and route a service flow according to the routing information.

10. The system according to claim 9, wherein,
the first BRAS (602) is further configured to retrieve the logical segment when there is an idle logical segment in the backup group, notify the CR to cancel routing information of the logical segment, and switch with the second BRAS which acts as a main device of the backup group; and the second BRAS (603) is configured to, notify the CR to update the routing information of the backup group when switching with the first BRAS and becoming the main device of the backup group.

* * * * *